United States Patent [19]

Henriksen

[11] 4,224,844
[45] Sep. 30, 1980

[54] RATCHET BOLT DRIVE APPARATUS INCORPORATING BIDIRECTIONALLY OPERABLE RECIPROCATING DRIVE MEANS

[76] Inventor: Ronald W. Henriksen, 2311 Gray Falls, Houston, Tex. 77077

[21] Appl. No.: 38,394

[22] Filed: May 14, 1979

[51] Int. Cl.³ .............................................. B25B 13/00
[52] U.S. Cl. ..................................... 81/57.46; 81/58.1
[58] Field of Search ..................... 81/57.39, 57.46, 58.1

[56] References Cited

U.S. PATENT DOCUMENTS

| | | | |
|---|---|---|---|
| 2,288,217 | 6/1942 | Troutman | 81/57.46 |
| 2,290,197 | 7/1942 | Merriman et al. | 81/57.46 |
| 2,292,391 | 8/1942 | Merriman et al. | 81/57.46 |
| 2,530,553 | 11/1950 | Strobell | 81/57.46 |

*Primary Examiner*—James L. Jones, Jr.
*Attorney, Agent, or Firm*—Gunn, Lee & Jackson

[57] ABSTRACT

A ratchet drive mechanism is disclosed. In the preferred and illustrated embodiment, it includes a handle and ratchet drive mechanism for rotating a bolt. It rotates the bolt through torque applied to the handle. In addition, it incorporates a bidirectionally operable reciprocating means for driving the bolt. The handle supports a drive chain which rotates around a pair of sprockets. A push rod supports a lock means which engages the chain. It hooks against the chain, thereby enabling the chain to be pushed and pulled on alternate strokes. The chain is thus rotated around the sprockets, one of the sprockets being an idler and one of the sprockets being mounted on the exterior of the drive of the mechanism. When low torque is required, the push rod can be manipulated. When high torque is required, the handle can be used.

11 Claims, 5 Drawing Figures

U.S. Patent    Sep. 30, 1980    4,224,844
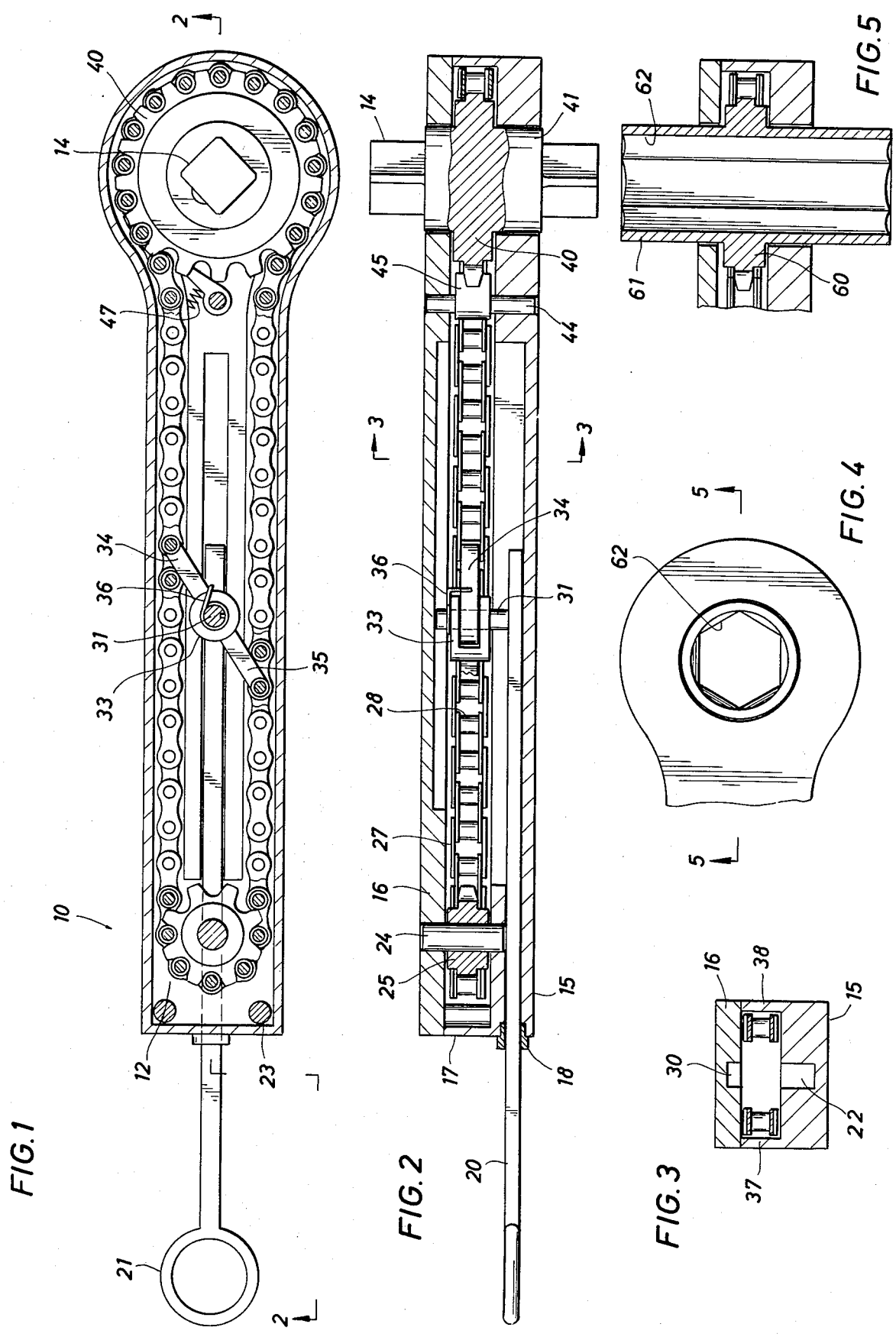

4,224,844

RATCHET BOLT DRIVE APPARATUS INCORPORATING BIDIRECTIONALLY OPERABLE RECIPROCATING DRIVE MEANS

BACKGROUND OF THE DISCLOSURE

The patent of Merriman No. 2,292,391 (and his earlier No. 1,903,514) shows a kind of pull-type activating mechanism superimposed on a ratchet apparatus which operates like a torque arm in loosening a bolt. The structure shown in U.S. Pat. No. 2,288,217 is also of interest in showing equipment of this general concept. The referenced U.S. patents are of interest to the apparatus of the present disclosure. The present disclosure, however, shows an apparatus which is superior to the structures shown in the references. The present apparatus is a conventional ratchet mechanism when one desires to use it in this manner. Accordingly, it has three major components, the first being a long handle which can be gripped by a user for rotation. It secondly includes a drive, and the drive may take several forms. One form of drive is a square shaft having shoulders or sides cut to a specified norm, enabling it to engage sockets. The third significant portion of the apparatus is a ratchet mechanism which engages the drive for rotation about an axis through the drive supported by the handle. Thus, rotation in one direction is permitted by ratcheting action, while rotation in the opposite direction is prevented. The present invention provides a structure which has the ability to function with a handle, socket drive and ratchet mechanism.

Above and beyond the foregoing, the present invention also includes an apparatus which enables a push-type rod to be hand engaged. The rod protrudes from the end of the handle. The rod can be engaged by hand and reciprocated by pushing and pulling. A push-pull motion rotates the drive selectively locked by he ratchet mechanism. This is accomplished by reciprocating motion. Typically, the handle must be used to break through the initially resistant torque in loosening a stubborn bolt or the like. Once the initial torque breaks over, the bolt will usually rotate with greater facility. At that juncture, the push rod can be engaged and reciprocated, imparting high speed rotation to the bolt. If unexpected resistance is then encountered, the push rod mechanism can be momentarily disused, and the resistance of the bolt is thereafter overcome by continued rotation of the handle.

The present invention is particularly advantageous in that it enables both kinds of motion to be applied to the bolt with the same equipment. In particular, it enables the mode of torque application to be switched rather rapidly. A changeover is accomplished with no changeover in the deployment or rigging of the tool. Accordingly, the only changes which are implemented with the tool, itself, are changes in the sockets mounted on the drive. The apparatus is also able to be constructed with a single, permanently fixed socket which is dual-ended. This will permit it to engage as, for example, a spark plug, a very common size.

BRIEF DESCRIPTION OF THE DISCLOSURE

This disclosure is summarized as a ratchet drive apparatus which functions at selected times in the customary manner. The ratchet mechanism includes a handle, a socket drive mechanism and a ratchet mechanism connecting the socket drive and handle together. Internally, an elongate push rod driven by an external handle slides axially of the handle and supports an upstanding pin. The pin supports a lock means which protrudes to the side. The lock means engages an elongate link chain deployed on both sides of the push rod. It locks against links of the chain. The link chain is extended between a pair of sprockets, one being an idler and the other extending around the socket drive. When the handle is manipulated, the lock means jams against the chain to limit movement to only one direction even though reciprocation in both directions occurs. This imparts rotation to the sprockets and the socket.

BRIEF DESCRIPTION OF THE DRAWINGS

FIG. 1 is a top view of the improved ratchet wrench with a portion of the top cover removed for sake of clarity to illustrate internal details of construction and, in particular, a push rod handle for driving a chain deployed within the ratchet;

FIG. 2 is a sectional view along the line 2—2 of FIG. 1 showing details of construction;

FIG. 3 is a sectional view along the line 3—3 of FIG. 1 showing a link chain positioned within the handle and the arrangement of the chain relative to the handle;

FIG. 4 shows an alternate form of socket drive in contrast with the one shown in FIG. 1; and FIG. 5 is a sectional view through the apparatus shown in FIG. 4 showing a hollow socket drive.

DETAILED DESCRIPTION OF THE ILLUSTRATED EMBODIMENT

In the drawings, the present invention is identified by the numeral 10. The device as a whole will be referred to hereafter as a ratchet wrench. Viewed solely as a ratchet wrench, it incorporates three major structural elements. The first is a handle 12 which has a length and width enabling it to be grasped and to exert torque dependent on the length. The device can be made in several sizes which can be scaled upwardly or downwardly as desired. The handle 12 is a closed, hollow housing supporting a socket drive 14. The socket drive 14 can have several forms. For instance, it can be a square drive or perhaps a hexagonal drive. It can be increased or decreased in scale. It can be a solid bar as illustrated in FIG. 2, or it can be a hollow sleeve-like member shown in FIG. 5. The socket drive is a means for connecting with a socket to provide a multipurpose, multidimensional ratchet wrench. For repetitive use on a single size, however, a single socket can be constructed in lieu of the solid drive bar. A single socket is shown in FIG. 5. The single socket is sized to a particular dimension; for instance, it can be sized to remove spark plugs. Typically, spark plugs are constructed in accordance with an industry standard having a standard diameter and six sides. The construction of the socket drive in FIG. 5 makes the tool a limited purpose tool which, nevertheless, is of great value to a mechanic.

The handle 12 rotates the socket drive through a ratchet mechanism which permits rotation in one direction and prevents rotation in the opposite direction. This enables the handle to be oscillated around the bolt with the bolt unthreaded on torque applied in one direction, while torque applied in the opposite direction merely rotates the handle while slipping at the ratchet mechanism, whereby the socket drive shaft is not rotated.

The present invention is best considered on a detailed description of the apparatus. The numeral 15 identifies a base or bottom plate in the handle. It is covered over by a parallel top plate 16 and is closed over at the end by an end plate 17 perforated with a drilled hole. The hole passes through a solid portion of the body, and a bushing 18 is inserted in the hole. The bushing fits snugly about a push rod 20 which includes a hand engaged eyelet 21 exposed at one end. The push rod 20 passes through the bushing 18 and extends through an internally drilled passage which is a drilled hole at the remote end of the handle. The passage, however, soon opens into a rectangular slot 22 shown in FIG. 3. There, it will be observed that the bottom plate is fairly thick in comparison with the top plate 16 to enable the lengthwise groove or slot 22 to be formed in it. The groove or slot 22 aligns the push rod 20 for purposes to be described. The top plate is joined to the bottom plate by means of bolts or spot welded posts 23 shown in FIG. 1. The top plate 16 is thus held parallel to the bottom plate 15, and an internal space is located between them to receive the movable portions of equipment to be described.

FIG. 2 shows that the top and bottom plates are drilled and support a stub axle 24 which, in turn, supports an idler sprocket 25. The sprocket 25 is provided with external teeth which engage a link chain 27 constructed of roller links. It more nearly resembles bicycle chain. It is formed with roller links at spaced or regular locations so that it is able to pass over the sprocket to rotate the sprocket. The teeth of the sprocket protrude between adjacent rollers of the chain. Hereafter, the chain will be described either generally as the chain 27 or a roller 28, referring to the similar rollers in general.

It will be recalled that the push rod 20 is received in a rectangular, open top groove 22 which is formed parallel to a similar groove 30 in the top plate 16 as illustrated in FIG. 3. It is not quite as deep, the plate 16 being relatively thin in comparison with the plate 15. The two facing channels 22 and 30 are aligned with one another; that is to say, FIG. 3 discloses them to be vertically aligned. In their aligned position, they can both receive an upstanding mounting post 31 which is supported near the end of the push rod 20 and is sufficiently tall that it stands in both channels 22 and 30. It, therefore, slides with the push rod, but it is guided in an upstanding position by the two channels which enclose it. The mounting post 31 supports a lock means which incorporates a perforated clevis 33 mounted on the post 31. The clevis 33 surrounds one end of a first arm 34 and supports a diametrically opposite second arm 35. The arms 34 and 35 are arranged oppositely of one another and are approximately equal in length. It will be observed that the locus of the mounting post 31 is positioned at the midpoint between the locus of the chain on both sides. the deployed arms are supported on the bushing and are rotatable along with the bushing. As viewed in FIG. 1, they are rotated by a coil spring 36 in a counterclockwise direction, carrying the arms 34 and 35 to a point where they contact the chain. Each arm terminates in a curved face which is cut to a diameter matching the rollers 28 of the chain and shaped so that it is able to abut a particular roller in the link chain. Since the rollers are all similar, the two arms can catch at any point against the chain. As shown in FIG. 1, the arms 34 and 35 have been rotated to an extent such that they are in contact against rollers of the link chain. They are wedged into the chain with solid contact achieved at the curved end faces. They are constructed to jam into the chain, wedge against the next roller and then lock the arms at an angle which prevents further movement of the chain. It will be observed that the chain is free to move where the rollers are pulled away from the arms. The chain, however, is jammed and cannot move in the opposite direction.

When the arms 34 and 35 deflect as by rotation, the chain is jammed outwardly. The chain can deflect slightly, but its range of deflection is limited by the outer walls 37 and 38, better shown in FIG. 3. The walls 37 and 38 are regularly constructed of rectangular stock and close the internal volume of the handle.

Attention is next directed to FIG. 1 of the drawings where the chain 27 extends around a large sprocket 40 equipped with external teeth for engaging the link chain. The sprocket 40 is formed of a single piece with a shaft 41 shown in FIG. 2. The shaft 41 extends through the top and bottom faces of the apparatus to define exposed faces which, in turn, support upstanding square drives. The apparatus is symmetrical through the provision of rectangular or square drives on the top and bottom. Thus, the handle can be turned over to obtain rotation in the opposite direction.

The sprocket is larger in diameter than the shaft 41 and extends into an undercut cavity, the cavity having the form of an enlarged space between the bottom plate 15 and the top plate 16. So to speak, the top and bottom plates are extended to a circular form better illustrated in FIGS. 1 and 2. The sidewalls 37 and 38, of course, come together in the form of an encircling, cylindrical enclosure.

As shown in FIG. 2, the ratchet wrench includes the sprocket 40 which is captured in the handle to permit rotation. Rotation is ordinarily limited to a single direction. A shaft or post 44 is supported in suitably drilled and located holes through the plates defining the handle, and it supports a cantilevered arm 45 protruding in a radial direction from the shaft 44. The shaft 44 supports the arm 45 for rotation through perhaps thirty to sixty degrees of rotation. This is all the rotation that is necessary for ratcheting movement to jam against the teeth of the sprocket 40. It is in the lock position shown in FIG. 1. That is to say, the arm 45 extends between a pair of teeth of the sprocket to lock against rotation. A spring 47 biases the mechanism to drive the arm between the teeth. As viewed in FIG. 1, clockwise rotation is permitted; counterclockwise rotation is forbidden inasmuch as the tip of the arm jams between the teeth and prevents rotation. In summary, it serves as a ratchet limiting the sprocket to rotation in a single direction while permitting rotation in the other direction.

In operation, the device functions in the following manner. For purposes of illustration, assume that a socket of a suitable size is affixed to the ratchet drive 14. Assume further that it is engaged with a stubborn bolt which simply takes substantial torque to break free. After the torque has been applied, it will eventually break free. Torque is applied by rotation of the handle. The handle is rotated in a direction such that the ratchet arm 45 locks the sprocket against slippage. The lock position is achieved and maintained during the initial rotation of the stubborn bolt. After it breaks free, the handle will rotate through some arc which is typically limited by the surrounding apparatus near the bolt of interest. As an example, the work space may simply be limited. When the handle is rotated through an arc carrying it to a remote and perhaps inconvenient location, the next step is to retract the handle back through the same arc by rotation. That movement is accompanied by ratcheting action at the arm 45 as it rides over teeth of the sprocket. The frictional drag in the sprocket and chain arrangement is less than the frictional drag of the bolt and the threads about the bolt. Accordingly, the bolt remains stationary during the return stroke, while the sprocket 40 rotates. Its rotation is accompanied by rotation of the chain. The chain is carried around the sprocket and rotates with it. Needless to say, the chain which is deployed in the handle also moves, and its movement is facilitated inasmuch as it rides past the arms 34 and 35. So to speak, the arms, themselves, ratchet as the chain rollers are pulled against the arm tips in a direction causing ratcheting action. Another arcuate movement is applied to the handle.

At some point, the resistance of the bolt is sufficiently reduced to enable the feature of the present invention to be used. Typically, the user can tell when the resistance of the bolt has decreased sufficiently to permit this. As an example, it may take one hundred foot pounds of torque to break the initial resistance of a bolt; however, this may require only one or two rotations of the bolt. The bolt may require an additional thirty revolutions, eventually to be fully unthreaded, especially if the bolt is fairly long. When the torque resistance of the bolt is reduced, the user is then able to grasp the handle 21 of the push rod 20 for more rapid operation. It will be kept in mind that the handle, itself, drives the bolt only during half of its movement. The other half of its movement is merely resetting it to a convenient position. This is not the case with the push rod 20 which is grabbed by the user and pulled outwardly as viewed in FIG. 1. When it pulls outwardly, the push rod couples through the arm 35 against the rollers of the chain and drags the chain with it. The acute angle of the arm 35 clearly requires that the chain must be pulled with it. As it is pulled, the chain moves in the handle and, of course, rotates the gears at each end. The sprocket 40 is rotated which, in turn, rotates the socket drive and the socket, itself. The push rod is pulled out to the limit of its length, and, thereafter, it is pushed in. Each stroke, whether pulling out or pushing in, drives the chain in the same direction inasmuch as the arms 34 and 35 work against different portions of the link chain. In both instances, however, the chain is either pushed or pulled in the same direction. The chain is, therefore, driven by strokes in both directions, but its movement is in a single direction.

The chain thus drives the sprocket 40 which, in turn, rotates the socket drive. This continues as long as the torque resistance of the bolt is acceptable. The push rod can be used until excessive resistance is encountered. Assuming that excessive resistance is encountered unexpectedly and the user cannot overcome the resistance, he simply abandons the push rod and reverts to operation of the equipment through the handle. In other words, the handle 12 is again rotated to overpower the resistant torque. When the bolt is finally loosened, it can be removed, and the apparatus is free to be used again.

The device operates to thread or unthread a bolt. This is achieved by simply flipping the device over, utilizing the socket on the opposite end of the shaft and operating as described before. It will be observed that inverting the drive mechanism is fairly easy. Indeed, it requires only that the equipment be turned over.

Attention is directed to FIGS. 4 and 5, jointly, where an alternate form of equipment is shown. There, the sprocket 60 is integrally formed with a hollow sleeve 61. The sleeve, itself, functions as a socket, it being constructed with a six-sided internal cavity at 62. The cavity 62 can easily extend all the way through the equipment which is particularly useful in fabricating a spark plug wrench. While this is limited purpose equipment, spark plugs are quite often very difficult to reach and difficult to break free. Once they break free, they can be unthreaded quite rapidly. To this end, the socket 61 is shaped to some dimension and is preferably provided with a six-sided cavity. Needless to say, nuts and bolts are known which have different dimensions and different profiles as, for example, four, six and eight-sided shapes. The socket can obviously be made to accommodate variations in scale and profile.

Strength of the present invention depends in large part on the torque which is to be applied to it. As the torqur maximum increases, heavier duty equipment must be used. To this end, the chain 27 can be increased in size. As it is increased in size, all of the equipment increases proportionately. This is no particular drawback; indeed, a larger and longer handle is ordinarily required to unthread larger bolts. Accordingly, the handle length is preferably increased as the torque levels increase. This reduces the strain on the mechanic who uses the device.

While the foregoing is directed to the preferred embodiment, the scope is determined by the claims which follow.

I claim:

1. An improvement for a ratchet wrench which includes an elongate handle to be grasped by a user, a socket drive rotatably supported by the handle and a ratchet mechanism which selectively permits rotation of the socket drive in one direction and prevents rotation in the opposite direction, the improvement comprising:
    (a) a sprocket connected to the socket drive for rotation therewith;
    (b) an elongate, closed loop, flexible chain operatively engaged with said sprocket;
    (c) an idler sprocket engaged with said chain, said idler positioned in said handle such that said chain is deployed in a pair of adjacent portions movable in parallel loci along said handle wherein said handle is hollow to receive said idler sprocket and wherein said chain portions are located therein;
    (d) a hand operated reciprocable rod extending from within said handle;
    (e) a movable pivoted lock means connected to and moved by said rod along a path adjacent to said chain portions; and
    (f) said lock means being within said handle and including a pair of similar chain engaging means deployed to engage both chain portions in the handle and further being constructed and arranged to engage one chain portion on movement of said rod out of the handle and further engaging the other chain engaging means with the remaining chain portion on movement into the handle, each of said chain engaging means positively holding said chain on movement in one direction, while the other chain engaging means does not positively hold said chain, said chain engaging means functioning alternately dependent on the direction of movement of said handle and further alternately not positively holding said chain such that said chain is rotated in a single direction relative to said sprockets.

2. The apparatus of claim 1 wherein said chain is a multi-link chain with spaced rollers and wherein said chain engaging means includes an elongate, protruding roller locking shoulder and said shoulder is located on an angularly rotatable arm supported on said lock means further located in a confined relationship to said chain to protrude at an angle into the locus of said chain and wherein the angle is limited by the relative size of a chain receiving passage in the handle.

3. The apparatus of claim 2 wherein said passage has a given width defined by a pair of facing and spaced walls and wherein said lock means and chain engaging means are sufficiently large relative to said passage to permit only limited rotation of said chain engaging means.

4. The apparatus of claim 1 wherein
 (a) said chain is externally deployed around said sprockets and extends along and inside of an internal passage in the handle;
 (b) said chain further having spaces therein adjacent to rollers which spaces are sized to receive a shaped shoulder comprising said chain engaging means which shoulder is contoured to cylindrically contact said chain rollers; and
 (c) said chain engaging means further including two arms terminating at said shoulders.

5. The apparatus of claim 1 wherein
 (a) said rod includes an elongate handle extending into the handle at an end located opening in the handle; and
 (b) said handle includes a lengthwise passage shaped to guide said rod during lengthwise movement and further to guide and locate said chain portions.

6. The apparatus of claim 1 wherein
 (a) the ratchet mechanism includes a pivotally mounted arm which jams against said sprocket to jam said sprocket against rotation;
 (b) said arm is mounted on a transverse shaft for rotation against the socket drive; and
 (c) said sprocket is between a pair of spaced top and bottom walls defining the handle, which handle is at least partially hollow to receive said sprocket and said chain therein.

7. The apparatus of claim 6 wherein said sprocket, idler sprocket and said chain are arranged in a common plane parallel to the handle enclosing the hollow place therein.

8. The apparatus of claim 1 wherein said lock means includes a pivotally mounted, double ended arm pivotally mounted on an upstanding mounting post connected to said rod.

9. The apparatus of claim 8 wherein said post supports said arm so the ends thereof point toward said chain portions and said arm pivots to jam into said chain portions.

10. The apparatus of claim 8 wherein said arm is rotated to contact said chain by a resilient means.

11. The apparatus of claim 8 wherein said arm is permitted to rotate toward an angle bringing said arm into contact with said chain, but is prevented from rotating past a position perpendicular to said chain portions.

* * * * *